United States Patent [19]

Horikawa et al.

[11] Patent Number: 4,620,085
[45] Date of Patent: Oct. 28, 1986

[54] FLOOR COVERINGS HAVING BUILT-IN HEATER

[75] Inventors: Toshihiro Horikawa; Nobumori Kuwabara, both of Nara, Japan

[73] Assignee: Matsushita Electric Industrial Co., Ltd., Osaka, Japan

[21] Appl. No.: 638,614

[22] Filed: Aug. 7, 1984

[30] Foreign Application Priority Data

Aug. 12, 1983 [JP] Japan ................. 58-125733

[51] Int. Cl.4 ............................................. H05B 3/34
[52] U.S. Cl. ..................... 219/528; 174/51; 219/549
[58] Field of Search ............... 219/213, 345, 528, 548, 219/549; 174/51, 78; 361/42; 307/326; 339/14 L

[56] References Cited

U.S. PATENT DOCUMENTS

| 3,209,128 | 9/1965 | Chapman, Jr. | 219/528 |
| 3,264,595 | 8/1966 | Hager, Jr. | 219/213 X |
| 3,397,302 | 8/1968 | Hosford | 219/528 |
| 3,454,746 | 7/1969 | Dubois | 219/549 |
| 3,465,121 | 9/1969 | Clark | 219/213 |
| 3,467,938 | 9/1969 | Jahr | 174/51 X |
| 3,766,644 | 10/1973 | Davis | 219/213 X |
| 3,781,757 | 12/1973 | Barnes | 174/51 X |
| 3,812,320 | 5/1974 | Borgren | 219/213 |
| 4,294,003 | 10/1981 | Coverstone | 219/213 X |

FOREIGN PATENT DOCUMENTS 838497 6/1960 United Kingdom ................ 219/528

Primary Examiner—Clarence L. Albritton
Assistant Examiner—Teresa J. Walberg
Attorney, Agent, or Firm—Wenderoth, Lind & Ponack

[57] ABSTRACT

A floor covering having a built-in heater which includes a planar sandwich structure including an underlining layer of heat insulating material, at least one heating element provided on one surface of the underlining layer, an electric conductor provided on the one surface of the underlining layer so as to cover the heating element, a surfacing layer overlaying the conductor on one side of the heating element opposite to the underlining layer, and a lead wire for connecting the conductor to ground.

7 Claims, 3 Drawing Figures

FLOOR COVERINGS HAVING BUILT-IN HEATER

BACKGROUND OF THE INVENTION

The present invention generally relates to floorcoverings or floor covering having an electric heater built therein and, more particularly, to an improvement of the safety of the floorcoverings having a built-in heater.

A carpet, mat or pad having an electric heater built therein is well known. The heater embedded in, for example, a carpet, is a planar heater in the form of either one or a combination of one or more heating wires and one or more film heaters and is generally distributed over the surface of the carpet. One example of prior art heating carpet is shown in partial sectional representation in FIG. 1 of the accompanying drawings.

Referring to FIG. 1, the prior art heating carpet is generally of a planar sandwich structure including an underlining layer 1 of heat insulating material, a continuous electrically insulated heating wire 2 placed immovable on one surface of the underlining layer 1 so as to extend in a generally zig-zag-shaped configuration, a metallic foil 3 placed on said one surface of the underlining layer 1 so as to cover the heating wire 2 for the uniform distribution of heat produced by the heating wire 2, and a surfacing layer 4 of any suitable material, for example, textile fabric, placed on the metallic foil 3. The opposite ends of the heating wire 2 are drawn into a box secured to a portion of the peripheral edge, or a corner area, of the carpet and are secured to respective plug pins through a controller in the box.

With the prior art heating carpet, it has been found that, when a needle or the like is inadvertently or accidentally pierced into the carpet with its tip contacting the heating wire 2 during the operation and when someone subsequently happens to touch such needle, he or she will receive an electric shock.

SUMMARY OF THE INVENTION

Accordingly, the present invention has been developed with a view to substantially eliminating the above described problem inherent in the conventional heating floorcoverings and has for its essential object to provide an improved heating floorcovering of a type wherein care is taken to improve the safety thereof.

In order to accomplish this object of the present invention, the heating floorcovering is provided with means for connecting the metallic foil to the ground. This connecting means is, according to one preferred embodiment of the present invention, constituted by a grounding terminal rigidly provided in the box and electrically connected with the metallic foil. When the floorcovering is in operation with electric power supplied thereto, the grounding terminal has to be connected to the ground through an external wiring or conductor.

In another preferred embodiment of the present invention, the connecting means is constituted by a continuous wiring embedded in an electric power supply line with its opposite ends connected to the metallic foil and one of the connecting pins of a three-pin plug connector.

In either case, the metallic foil, when a needle pierces the heating floorcovering with its tip in contact with the heating wire, serves as a current collector, and the current collected thereby is in turn grounded to the connecting means. Therefore, the possibility of someone receiving the electric shock is advantageously minimized.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE PREFERRED EMBODIMENT

Figure 1:
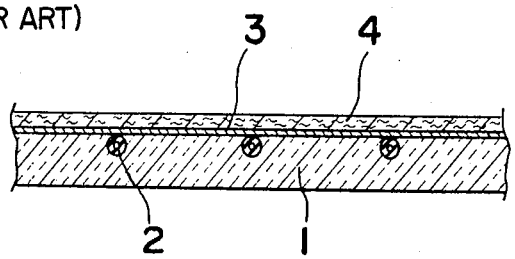
FIG. 1 is a partial section view of the prior art heating carpet.

Before the description of the present invention proceeds, it is to be noted that like parts are designated by like reference numerals throughout the accompanying drawings, except for FIG. 1.

Figure 2:
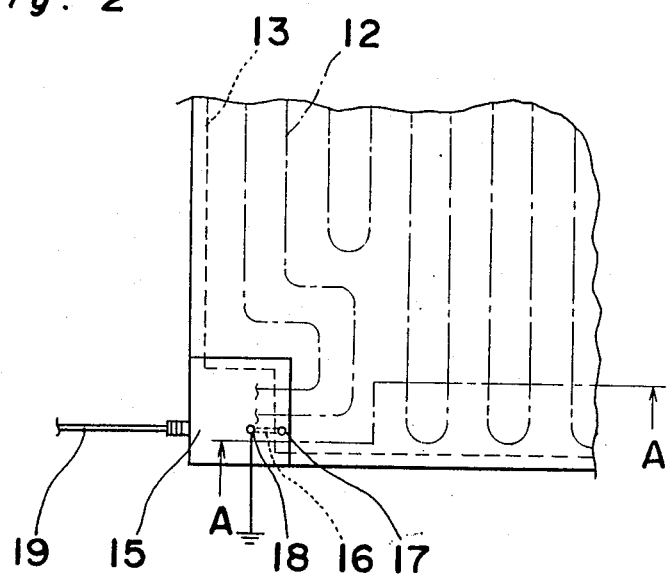
FIG. 2 is a top plan view of a corner area of a heating carpet embodying the present invention.
Figure 3:
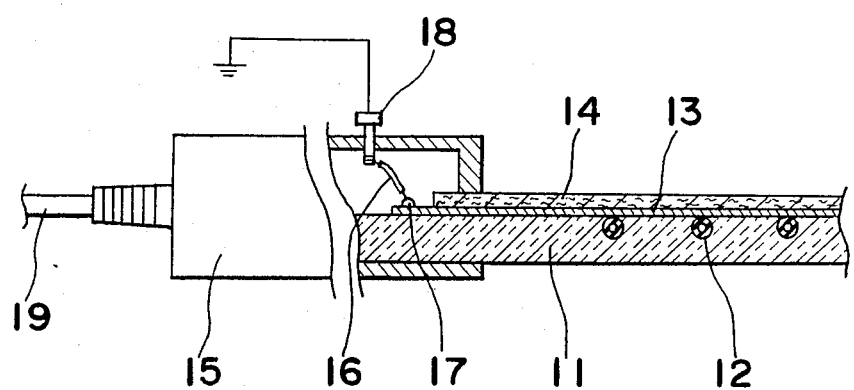
FIG. 3 is a cross-sectional view taken along the line A—A in FIG. 2.

Referring now to FIGS. 2 and 3, a generally square heating carpet so far shown therein is of a planar sandwich structure including an underlining layer 11 made of heat insulating material, at least one continuous electrically insulated heating wire 12 immovably placed on one surface of the underlining layer 11 so as to extend in a generally zig-zag shape, a metallic foil 13 preferably made of aluminum and applied on said one surface of the underlining layer 11 so as to cover the heating wire 12, and a surfacing layer 14 placed or bonded on the metallic foil 13 and made of any known material. The metallic foil 13 is provided for concurrently substantially uniformly distributing heat produced by the heating wire 12 during the operation of the heating carpet over the entire surface area thereof and for collecting an electric current in the event of shortcircuiting between it and the heating wire 12.

The heating carpet of the above described construction has one of the four corner areas provided with a controller box 15 within which the opposite ends of the heating wire 12 are connected to a power supply line 19 through any known controller (not shown) including, for example, a power supply control switch, a fuse and a temperature adjustment. Within the controller box 15 having a grounding terminal member 18 secured thereto so as to extend across the wall of the box 15, a lead wire 16 having one end soldered to an inner end of the terminal member 18 extends therefrom to the metallic foil 13 with the other end soldered at 17 to said metallic foil 13.

When and so long as the heating carpet is in operation with an electric power supplied to the heating wire 12 through the controller from the power supply line 19, and in the event that the heating wire 12 is shortcircuited with the metallic foil 13 by way of a needle pierced through both the surfacing layer 14 and the metallic foil 13 to an electrically charged portion of the heating wire 12, the current can be conducted through the metallic foil 13 and then through the lead wire 16 to the terminal member 18. Since the terminal member 18 is, when the carpet is in use, connected to the ground through an external wiring, the current so conducted is then conducted to the ground. Therefore, even if someone touches the needle, the current is grounded rather than flowing to the human body having a high electric resistance, with the possibility of the electric shock being consequently minimized.

Although in the foregoing description reference has been made to the use of the heating wire, a planar heater utilizing a resistance heating film may also be used for a heating element.

It is to be noted that, where an electric power outlet is provided with a three-terminal socket having three terminals, one of which is used for the connection with the ground, and a three-pin plug is corresponding used in the power supply line 19, the lead wire 16 may extend in the form as embedded in the power supply line 19 and in which case the terminal member 18 may be omitted.

It is also to be noted that, instead of the use of a soldering technique for connecting the lead wire 16 to the metallic foil 13, the lead wire 16 may be connected by curling a corner area of the metallic foil 13 to crimp with that end of the lead wire 16 clamped inside the crimped corner area of the metallic foil 13.

The metallic foil 13, preferably made of aluminum, may have at least one surface coated with an adhesive material. In this case, not only can the physical strength of the foil 13 be increased because of the presence of the adhesive layer, but also the lead wire 16 can readily by connected thereto and the layers forming the heating carpet can readily and easily be fabricated together to provide a sandwich structure.

Although the present invention has fully been described in connection with the preferred embodiment thereof with reference to the accompanying drawings, it is to be noted that various changes and modifications are apparent to those skilled in the art. Such changes and modifications are to understood as included within the scope of the present invention as defined by the appended claims, unless they depart therefrom.

What is claimed is:

1. A floorcovering having a built-in heater, comprising a planar sandwich structure including an underlining layer of heat insulating material, at least one electrically insulated heating element provided on one surface of the underlining layer, a metallic foil provided on said one surface of the underlining layer so as to cover the heating element, a surfacing layer overlying the metallic foil on one side of the heating element opposite to the underlining layer, and electrical means for electrically and mechanically connecting the metallic foil to ground; and a power take-in unit having means for supplying external electric power therethrough to the heating element, said power take-in unit including a protective casing having a wall, said surfacing layer and said underlining layer extending into said wall and being secured to said wall, said metallic foil extending into said casing through said wall, said electrical connecting means extending into said casing, said metallic foil and said electrical connecting means being connected together in said casing, whereby said casing protects the connection between said metallic foil and said electrical connecting means from external physical forces, said underlining layer, said at least one heating element, said metallic foil, said surfacing layer, said electrical connecting means and said protective casing being secured together.

2. A floor covering as claimed in claim 1, wherein the metallic foil is an aluminum foil.

3. A floor covering as claimed in claim 2, wherein said connecting means comprises a lead wire having one end connected to the metallic foil and the other end adapted to be grounded.

4. A floor covering as claimed in claim 3, wherein said connecting means further comprises a grounding terminal member adapted to be grounded, secured to and extending through said casing, said lead wire being electrically connected to said terminal member inside said casing.

5. A floor covering as claimed in claim 1, wherein said connecting means comprises a lead wire having one end connected to the metallic foil and the other end adapted to be grounded.

6. A floor covering as claimed in claim 1, wherein said metallic foil has an adhesive layer formed on at least one surface thereof.

7. A floor covering as in claim 1, wherein said protective casing comprises a rigid box.

* * * * *